Patented Sept. 16, 1947

2,427,368

UNITED STATES PATENT OFFICE 2,427,368

COMPOUNDS OF i-BISNORCHOLENIC ACID AND A PROCESS FOR PRODUCING THE SAME

Byron Riegel, Evanston, and Edwin W. Meyer, Chicago, Ill., Romeo W. Gouley, Brooks, Oreg., and John Beiswanger, Washington, N. J.; said Riegel, said Meyer, and said Beiswanger assignors to The Glidden Company, Cleveland, Ohio, a corporation of Ohio No Drawing. Application February 29, 1944, Serial No. 524,488

10 Claims. (Cl. 260—397.1)

The present invention relates to a new method for the degradation of sterols, and to new compounds formed thereby.

The classical method for degrading the side chain of stigmasterol and similar sterols having a carbon-carbon double bond in the side chain and a 5,6-nuclear double bond, is to protect said nuclear bond with halogen or hydrohalides, and subjecting the resulting addition product to oxidation to cleave the side chain double bond. Bromine is generally used for protection of the nuclear double bond. The bromination of the 5,6-double bond of stigmasteryl acetate, for example, in preference to the 22—23 double bond may not be too selective and thus lead to a lower yield than would be expected if the bromination were purely selective. A truly selective method for protection of this nuclear double bond is therefore highly desirable.

It is therefore an object of the present invention to provide an improved process for the oxidative degradation of sterols having a carbon-carbon double bond in the side chain and a 5,6-nuclear double bond.

Another object is to provide a method of improved selectivity for protection of the 5,6-nuclear double bond of sterols containing a carbon-carbon double bond in the side chain.

A further object is to provide a method for simultaneously protecting the 3-hydroxy group and the 5,6-nuclear double bond of sterols containing a carbon-carbon double bond in the side chain, when such sterols are subjected to oxidative cleavage of the side chain double bond.

An additional object is to produce a new group of compounds in the steroid series.

Other objects will be apparent to those skilled in the art from the following description.

The foregoing objects may be accomplished by converting stigmasterol or a similar sterol into the corresponding i-ethers and subjecting these i-ethers to ozonolysis. According to the present conception of the structure of these i-ethers, their formulae possess a fused cyclopropane ring structure involving nuclear carbons atoms 3, 4 and 5 and an alkoxy group attached to nuclear carbon atom 6. This i-ether structure may be formulated as follows:

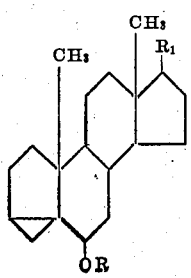

in which R is an alkyl group and $R^1$ is any group or radical.

The i-ether acids, formed from the oxidative cleavage of the side chain double bond of the corresponding i-ether sterols, and esters of these acids are valuable intermediates in the synthesis of physiologically active compounds. The i-ether structure once established, offers sufficient protection for further degradative and synthetic reactions thus avoiding the cumbersome halogenation and dehalogenation procedure.

The schematic outline below together with the examples which follow illustrate the invention.

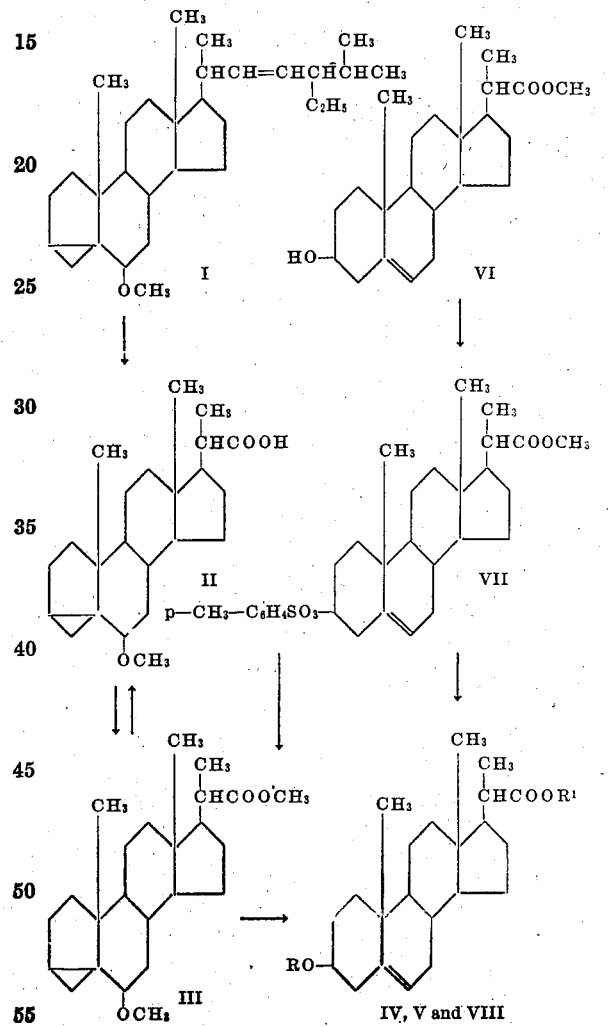

IV. R and $R^1$ = $CH_3$
V. R = Ac and $R^1$ = $CH_3$
VIII. R = $CH_3$ and $R^1$ = H

PREPARATION FROM I-STIGMASTERYL METHYL ETHER

Example I.—6-methoxy-i-bisnor-cholenic acid (II)

From 1.1 g. of stigmasterol, M. P. 162–163°, 1.2 g. (79%) of stigmasteryl p-toluenesulfonate, Fernholz and Ruigh, J. Amer. Chem. Soc. 65, 325 (1943), M. P. 147–148°, was prepared according to the method of Freudenberg and Hess, Ann., 448, 128 (1926).

Following the method of Fernholz and Ruigh, 8.49 g. (85%) of i-stigmasteryl methyl ether, M. P. 47–51°, was obtained from 13.3 g. of stigmasteryl p-toluenesulfonate. The yields on these two steps are not mentioned in the literature.

A solution of 3 g. of crystalline i-stigmasteryl methyl ether in 200 ml. of chloroform was cooled in an ice-bath and ozonized (5% ozone by volume at an oxygen rate of 3 liters per hour) for two hours. The solution was steam distilled after adding 10 ml. of 30% hydrogen peroxide. The yellow gum that separated during steam distillation was dissolved in ether. The ether solution was extracted several times with small quantities of cold 1 N sodium hydroxide. The combined alkaline extracts were extracted with ether, acidified with cold dilute hydrochloric acid and again extracted with ether. This cycle was repeated to insure the complete removal of the neutral material. The solution was dried with anhydrous sodium sulfate and upon removal of the ether 1.566 g. (62%) of a yellow viscous sirup remained. The sirup crystallized slowly from an ethyl acetate-petroleum ether (B. P. 62–93°) solution on standing in a cold-room. A yield of 0.732 g. of gummy crystals was obtained. Several crystallizations from acetone-hexane and ethanol gave small white plates melting at 174.8–176.3°; $[\alpha]_D^{25}+17°$ (18.2 mg. made up to 2.42 ml. with chloroform, $\alpha_D^{25}+0.126°$, 1, 1 dm.).

Anal. Calcd. for $C_{23}H_{36}O_3 \cdot H_2O$: C, 72.97; H, 10.11. Found C, 72.86; H, 9.54.

More rigorous drying of the sample, in vacuo over boiling benzene, resulted in partial loss of the water of hydration.

Anal. Calcd. for $C_{23}H_{36}O_3 \cdot 1/2H_2O$: C, 74.75; H, 10.09. Found: C, 74.43; H, 9.56.

Complete loss of water of hydration resulted on drying in vacuo over boiling toluene for thirty hours.

Anal. Calcd. for $C_{23}H_{36}O_3$: C, 76.61; H, 10.07. Found: C, 76.38; H, 9.44.

The methyl ester of the crude i-ether acid was made by treatment with diazomethane. A solution of 1.66 g. of the methyl ester, a yellow sirup, in 50 ml. of dry methanol containing five drops of concd. sulfuric acid was refluxed for four hours. The solution was diluted with water and extracted with ether. The yellow ether solution was washed with water, dried and the ether removed. A solution of the product in methanol after treatment with activated charcoal deposited a gummy solid upon standing in the cold-room. Sublimation of the gummy solid at 125–130° at $10^{-3}$ mm. gave 700 mg. of a white product melting at 100–110°. The product after crystallization from methanol melted at 115.1–117.6° and gave no melting point depression when mixed with an authentic sample of methyl 3-methoxy-5-bisnor-cholenate (M. P. 116.6–118.6°).

The ester saponified to give an acid, M. P. 194–200°; which was identical with 3-methoxy-5-bisnor-cholenic acid described in Example VI.

PREPARATIONS FROM METHYL 3-HYDROXY-5-BISNOR-CHOLENATE

Example II.—Methyl 3-p-toluenesulfonoxy-5-bisnor-cholenate (VII)

Methyl 3-hydroxy-5-bisnor-cholenate (VI) was prepared by the method described by Fernholz, Ann., 507, 128 (1933). A mixture of 1.647 g. of this methyl ester (VI) and 1.7 g. of p-toluenesulfonyl chloride in 4 ml. of dry pyridine was warmed until all solid material dissolved. After standing overnight the mixture was diluted with water, cooled to solidify the oil and filtered. The solid material was washed with 0.1 N sodium hydroxide, water and dried, yielding 2.313 g. (98%) of crude product. Crystallization from acetone gave 1.845 g. (78%) of material melting at 133–134°.

Anal. Calcd. for $C_{30}H_{42}O_5S$: C, 70.00; H, 8.22. Found: C, 70.11; H, 8.19.

Example III.—Methyl 6-methoxy-i-bisnor-cholenate (III)

A mixture of 1.296 g. of the previously described compound (VII) and 1.3 g. of fused potassium acetate in 50 ml. of anhydrous methanol was refluxed for three hours. Most of the methanol was removed and the residue dissolved in ether and water. The ether extract was washed with dilute alkali, water and dried over anhydrous potassium carbonate. After the ether was removed, 0.892 g. (98%) of light yellow oil was obtained. Molecular distillation of this oil at 140° and $10^{-4}$ mm. gave a colorless, viscous oil.

Anal. Calcd. for $C_{24}H_{38}O_3$: C, 76.96; H, 10.23. Found: C, 76.63, 76.82; H, 9.96, 10.15.

On standing, the purified oil crystallized, after which it was relatively easy to obtain the crystalline material from methanol, M. P. 72.0–72.8°, $[\alpha]_D^{25}+37.3°$ (43.2 mg. made up to 5 ml. with chloroform, $\alpha_D^{25}+0.332°$, 1, 1 dm.).

Example IV.—6-methoxy-i-bisnor-cholenic acid (II)

A 1.46 g. sample of the i-ether-ester (III) was saponified with methanolic potassium hydroxide. The reaction mixture was cooled, diluted with water and extracted with ether. The yellow aqueous layer was acidified and extracted with ether. This ether extract containing the acid was shaken several times with ice-cold 1 N sodium hydroxide. After acidifying the alkaline layer, the product was again taken up in ether. The ether layer was thoroughly washed with water, dried and the ether removed. The residue, 120 mg. of yellow sirup, crystallized upon evaporation of a hexane solution. Repeated crystallization from aqueous ethanol gave white platelets melting at 168–171°. A mixed melting point with the acid from the ozonolysis of i-stigmasteryl methyl ether (M. P. 175.3–177.3°) melted at 155–170°. The acid gave a specific rotation of $+33°$ (12.9 mg. made up to 2 ml. with chloroform, $\alpha_D^{23}+0.21°$, 1, 1 dm.).

Anal. Calcd. for $C_{23}H_{36}O_3$: C, 76.61; H, 10.07. Found: C, 76.76; H, 9.77.

A 100 mg. sample of the crude acid was reconverted to the methyl ester with diazomethane. This reaction product was rearranged to its normal methyl ether by refluxing its methanol solution containing a few drops of concentrated sulfuric acid. After chilling and diluting with water, a crystalline solid separated which was removed by filtration. A yield of 80 mg. of a product melting at 110–115° was obtained. Recrystallization from methanol gave glistening plates melting at 115–117°. They gave no mixed melting point depression when mixed with an authentic sample described in Example VI.

Example V.—Methyl 3-methoxy-5-bisnor-cholenate (IV)

(a) *By rearrangement of the i-methyl ether (III)*.—A solution of 520 mg. of the i-ether-ester (III) in 50 ml. of anhydrous methanol containing six drops of concentrated sulfuric acid was refluxed for three and one half hours. The reaction mixture was diluted with water and the product extracted with ether. The ether layer was washed with water, dilute sodium carbonate, water and dried. Upon removal of the solvent 510 mg. of white solid remained. Crystallization from methanol yielded 450 mg. (87%) of white plates melting at 115–117°. Further crystallizations from methanol raised the M. P. to 117–118°; $[\alpha]_D^{25} - 63.3°$ (42.2 mg. made up to 5 ml. with chloroform, $\alpha_D^{25} - 0.534°$, 1, 1 dm.).

Anal. Calcd. for $C_{24}H_{38}O_3$: C, 76.95; H, 10.20. Found: C, 77.37; H, 10.38.

(b) *Preparation from methyl 3-p-toluenesulfonoxy-5-bisnor-cholenate (VII)*.—A solution of 500 mg. of the p-toluenesulfonate in 25 ml. of anhydrous methanol was refluxed for four hours. Upon dilution with sufficient water, solid material separated which was removed by filtration and washed with water. After drying, 360 mg. (99%) of product was obtained, M. P. 114–117.5°. Crystallization from methanol gave plates melting at 116.5–117.5° which gave a M. P. of 116–118° when mixed with the rearranged product (M. P. 116.5–118°) from (a) above.

Example VI.—3-methoxy-5-bisnor-cholenic acid (VIII)

A 600 mg. sample of the previously described methyl ether-ester (IV) was saponified with methanolic potassium hydroxide. After refluxing eleven hours the potassium salt was isolated, washed with ether and converted to the free acid. Several crystallizations from methanol and from acetone gave needles or flat square crystals melting at 199–202°, $[\alpha]_D^{25} - 77.8°$ (88.2 mg. made up to 2 ml. with chloroform, $\alpha_D^{25} - 320°$, 1, 1 dm.).

Anal. Calcd. for $C_{23}H_{36}O_3$: C, 76.61; H, 10.07. Found: C, 76.98; H, 10.09.

Example VII.—Methyl 3-acetoxy-5-bisnor-cholenate (V)

A mixture of 610 mg. of the i-ether-ester (III), 1 g. of fused zinc acetate, 2 ml. of acetic anhydride and 50 ml. of glacial acetic acid was refluxed for four hours. The reaction mixture was diluted with water and thoroughly extracted with ether. The ether extract was washed with water, dilute sodium carbonate, water and dried. The ether was removed and the residue crystallized from methanol yielding 480 mg. (72%) of product melting at 137–139°. One additional crystallization raised the M. P. to 139–141°. A mixed M. P. with an authentic sample of methyl 3-acetoxy-5-bisnor-cholenate (M. P. 139–141°) showed no depression.

Example VIII.—6-methoxy-i-bisnorcholenic acid from mixed soya sterols

Ozone was passed into a solution of 28.9 grams of mixed soya sterol i-ethers in 500 ml. of $CCl_4$ at room temperature. A total of 36 millimoles of ozone was passed in during a period of two hours. The solution was steam distilled after the addition of 30 ml. of 30% hydrogen peroxide in 100 ml. of water. The yellow, gummy residue which separated during steam distillation was dissolved in ether. The ether solution was extracted several times with small quantities of cold 1 N sodium hydroxide. The combined basic extracts were then acidified with cold dilute hydrochloric acid and extracted with ether. In order to eliminate neutral material, this process was repeated. The final dry ether solution contained 4.1 grams of an amorphous solid $[\alpha]_D^{25} + 26$ (110.7 mg. made up to 5 ml. with chloroform, $\alpha_D^{25} + 0.58°$, 1, 1 dm.).

Anal. Calcd. for $C_{23}H_{36}O_3 \cdot \frac{1}{2} H_2O$: C, 74.75; H, 10.09. Found: C, 74.81; H, 9.95.

Neutral equiv. 376 (theory=361).

0.0440 gram required 5.81 ml. of 0.0201 N NaOH.
0.0526 gram required 6.96 ml. of 0.0201 N NaOH.

The methyl ester, $(\alpha)_D^{25} + 36$, was made by treatment with diazomethane and the i-ether-ester converted to the normal ether ester as described in Example I. The conversion product was identical with an authentic sample of methyl 3-methoxy-5-bisnorcholenate.

It is understood that the foregoing examples are merely illustrative and that various changes and modifications may be made without departing from the spirit and scope of the invention. Thus various alcohols other than methanol may be employed for the i-ether formation. Also substances other than potassium acetate which are capable of accepting a hydrogen ion or proton, such as salts of strong bases and weak acids, organic bases like pyridine, etc., other alkalis, etc. may be employed in the i-ether formation. Also in place of a compound having p-toluenesulfonoxy group in the 3-position compounds having other groups corresponding to the anion of strong acids such as bromine, chlorine, etc., may be employed. Esters other than the methyl esters, such as ethyl, propyl, etc., may also be made.

What is claimed is:

1. The process of preparing i-bisnorcholenyl ethers which comprises ozonizing an i-stigmasteryl ether.

2. The process of preparing esters of 6-alkoxy-i-bisnorcholenic acids which comprises ozonizing i-stigmasteryl methyl ether and esterifying the resulting 6-methoxy-i-bisnorcholenic acid.

3. The process of preparing esters of 6-alkoxy-i-bisnorcholenic acids which comprises heating a mixture of an ester of bisnorcholenic acid having the –OH group in the 3-position of the bisnorcholenic acid nucleus replaced with the anion of a strong acid, an alcohol and a proton acceptor.

4. The process of claim 3 in which the ester is a methyl ester and the alcohol is methanol.

5. Compounds selected from the class consisting of the 6-alkoxy-i-bisnorcholenic acids and lower alkyl esters of said acids.

6. 6-alkoxy-i-bisnorcholenic acids.

7. Lower alkyl esters of 6-alkoxy-i-bisnorcholenic acids.
8. 6-methoxy-i-bisnorcholenic acid.
9. Lower alkyl esters of 6-methoxy-i-bisnorcholenic acids.
10. Methyl 6-methoxy-i-bisnorcholenate.

BYRON RIEGEL.
EDWIN W. MEYER.
ROMEO W. GOULEY.
JOHN BEISWANGER.

REFERENCES CITED

The following references are of record in the file of this patent:

UNITED STATES PATENTS

| Number | Name | Date |
|---|---|---|
| 2,180,095 | Strassberger | Nov. 14, 1939 |

FOREIGN PATENTS

| Number | Country | Date |
|---|---|---|
| 490,756 | Great Britain | Aug. 19, 1938 |